INVENTOR
Johann Nikolaus Kiep
Walter Brose
BY
Dean Fairbank Hirsch & Foster
ATTORNEYS Patented Apr. 18, 1933

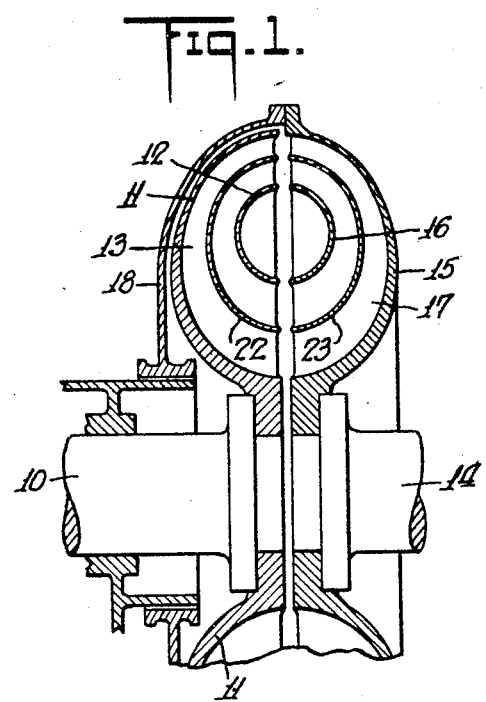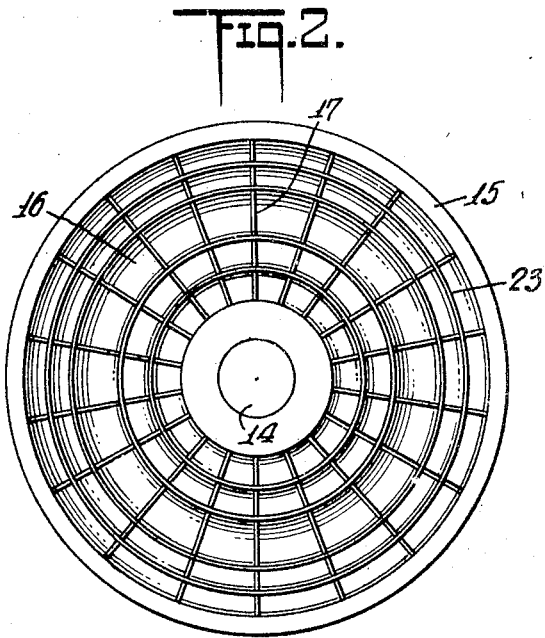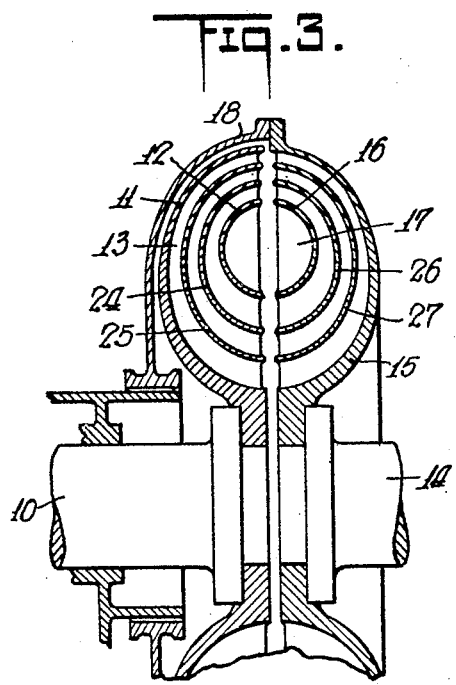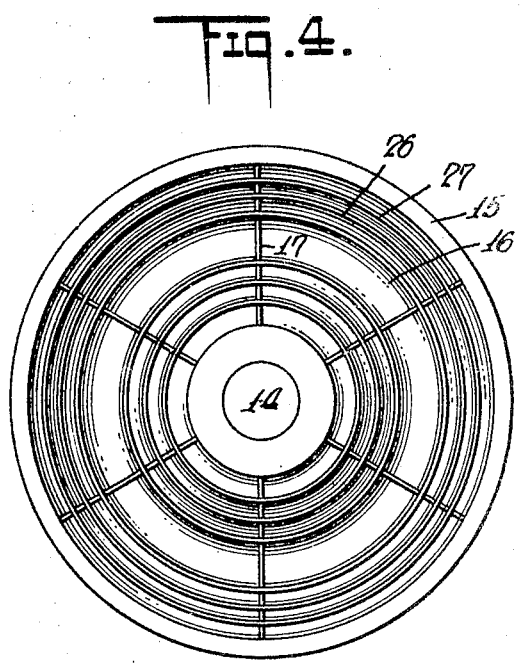

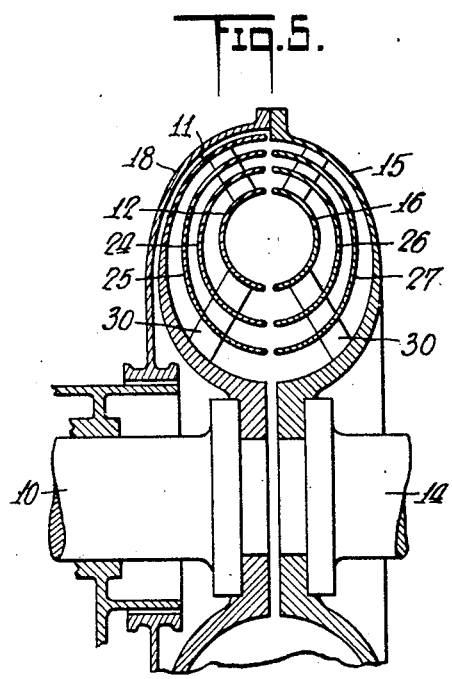
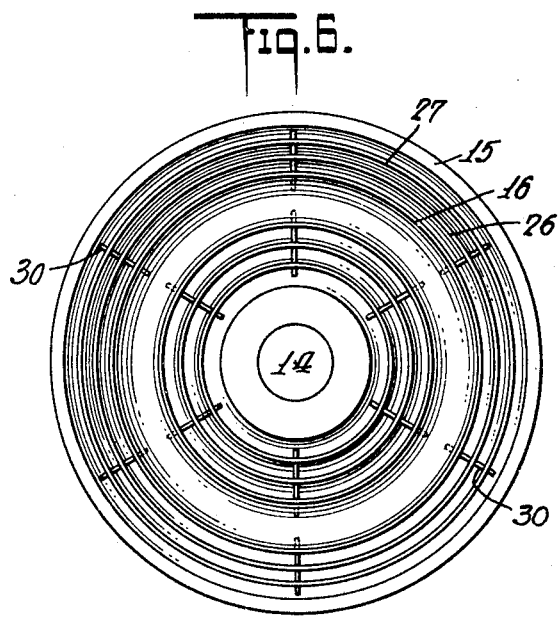
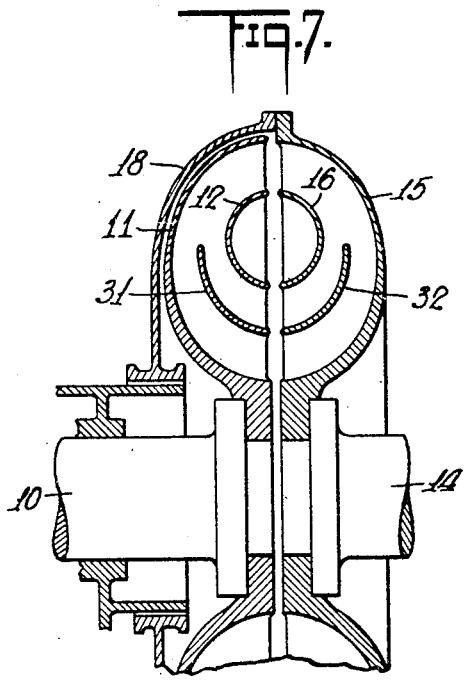
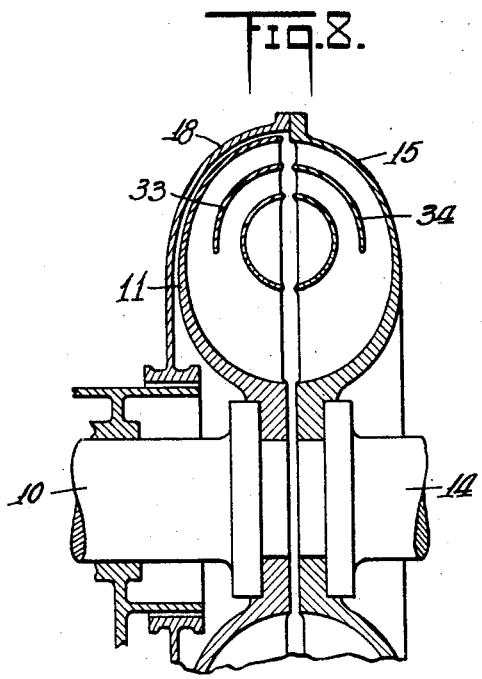

1,904,054

UNITED STATES PATENT OFFICE

JOHANN NIKOLAUS KIEP, OF ALTONA-HOCHKAMP, AND WALTER BROSE, OF HAMBURG, GERMANY

HYDRAULIC COUPLING

Application filed July 11, 1931, Serial No. 550,106, and in Germany November 11, 1930.

The invention relates to a hydraulic coupling of the Vulcan type wherein a driving member and a driven member are mounted coaxially for the circulation of liquid in a vortex ring so that the driven member is impelled by the kinetic energy of the liquid delivered thereto upon the rotation of the driving member. These driving and driven members are each usually provided with an annular series of vanes, blades or passages adapted to direct the impelling liquid, in the working chamber around a core ring constituted of two halves, one connected to the driving member and the other to the driven member. A construction of this general type is shown and broadly claimed in the Föttinger Patent 1,199,359, issued Sept. 26, 1916.

In a coupling of this type, when transmitting a normal torque, a decrease in the speed of the driving member increases the slip between the members so that there is a corresponding loss of efficiency. In some installations, this condition is objectionable especially where it is necessary or desirable to operate over an extended period with a constant transmission of torque from the driving member, and with the speed of said driving member varying through a wide range, as for example, in locomotives, vehicles and the like. In these cases, the load may remain substantially constant, while the speed is greatly varied.

In the usual form of the Vulcan coupling designed for a predetermined load and speed, the slip and efficiency are fairly definite and constant, but a decrease in the speed of the driven member, or any increase in the difference of speeds of the two members causes the speed of circulation of the liquid in the working chamber to be correspondingly increased. Such circulation of the impelling liquid causes the production of eddy currents, friction losses, and the like, thereby impairing the efficiency of transmission between the two members of the coupling.

The liquid, when traveling in a vortex ring, is also subjected to the action of centrifugal force due to rotation about the axis of the coupling. This radial component is effective more particularly as the liquid leaves the slower moving driven member and enters the faster driving member in the portion of the working chamber nearest the axis of rotation. As the liquid speeds up at this point it tends to move towards the center of the working circuit. This radial component has very little effect in transmitting power from one member to the other and increases as the speed of the driving shaft decreases, so that a corresponding decrease in the transmission efficiency is effected.

One object of the present invention is to provide a hydraulic coupling in which the flow of liquid in the working chamber is maintained in a more effective path and the efficiency of transmission is correspondingly increased, particularly under varying speed and load conditions.

As one important feature of the invention, there is provided one or more intermediate guide rings or members interposed between the core rings and the outer bounding wall of the working chamber so as to divide this chamber into a plurality of operating circuits. These guide members may be arranged to extend along the entire path of circulation of the liquid between the liquid inlets and outlets of the driving and driven members, or may extend along only a part of the path in the working circuit, so that guidance of the impelling liquid in the working chamber is effected only at the places where eddy currents or non-desirable direction of flow would otherwise be most likely to occur.

With a partial filling of the working chamber, a coupling of this improved construction is particularly advantageous, the intermediary rings preventing the disruption of the vortex ring.

In certain cases, it is desired to vary the amount of liquid in the working chamber of the coupling in accordance with the desired operation condition. This is particularly desirable in cases, for instance, where the driven member of the coupling is connected to a flywheel, which when stationary effects a load which is greater than the normal running load. This load caused by the inertia of said flywheel during the accelerating period in case of a full coupling, would be transmitted to the engine, so that the torque on the engine would increase and the engine may even stop if the inertia load is excessive enough. However, by means of a partially filled working chamber, the engine is permitted to rotate at a constant torque irrespective of the load. Also in cases where the driving shaft is connected to a motor, it is desirable to have a partially filled working chamber, so that the load of the flywheel or other sources of load may not be transmitted to the driving portion of the coupling to its full extent during its initial acceleration operation. If the countertorque transmitted by a heavy load, were impressed upon a motor, the failure of the motor to start would cause it to be burned out, and if other electrical devices were connected to the electric circuit, the heavy load impressed thereon would cause their injury.

The subdivision of the circulating section by the use of the improved construction of the present invention effects a more orderly regulation of the circulating flow, while filling of the coupling is taking place. When this filling of the coupling is being effected, the liquid first circulates in the outermost section or circuit, and as the liquid is introduced into the working chamber, the various sections are progressively filled towards the center until the coupling is completely filled.

Blades or vanes of an ordinary type of coupling are necessary to control the liquid flow or give it a radial direction in the members, but in the present improved construction the auxiliary guide rings act to retard tendency of the liquid to lag in the rotation of the members and therefore the number of vanes or blades may be very materially reduced and in some cases almost, if not entirely, eliminated. The greater the number of auxiliary guide rings the smaller need be the number or extent of the blades or vanes. The guide rings may be supported in spaced relationship by thin narrow struts or plates in place of the usual blades.

In the accompanying drawings there are shown for purposes of illustration, couplings having various forms and arrangements of auxiliary or intermediate guide rings, embodying the invention.

In these drawings:

Fig. 1 is a central longitudinal section through a coupling having a single pair of auxiliary guide rings, one being in the driving and the other in the driven member.

Fig. 2 is an inside end view of one of the members shown in Fig. 1.

Fig. 3 is a section similar to Fig. 1, but showing two pairs of auxiliary guide rings.

Fig. 4 is an inside end view of one of the members shown in Fig. 3.

Fig. 5 is a section similar to Fig. 3, but with the blades or vanes replaced by narrow struts or braces.

Fig. 6 is an inside end view of one of the members shown in Fig. 5, and

Figure 9:
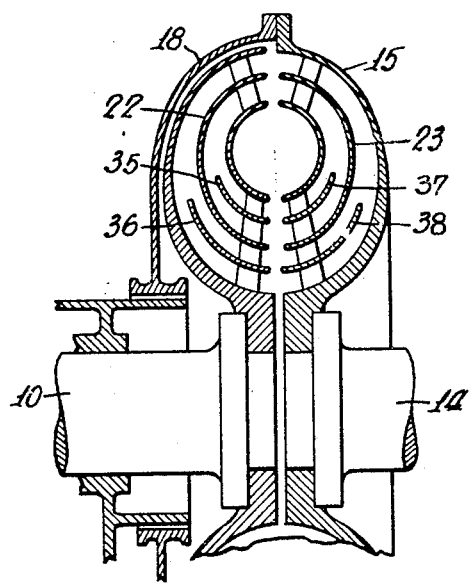

Figs. 7 to 12 inclusive are sections similar to Fig. 1 but with other types and arrangements of auxiliary guide rings.

The drawings illustrate the invention as applied to a type of Vulcan coupling in which there is provided a driving shaft 10 having connected thereto a driving member including a dished outer wall 11, a dished inner ring section 12, and a series of vanes or blades 13. A driven shaft 14 has a similar driven member including an outer dished wall 15, an inner dished ring section 16, and a series of radial vanes or blades 17. The two members are juxtaposed to enclose and define the working chamber around the core for the circulation of the liquid in a vortex ring, the inlets to the passages between the vanes of the driving member being opposed to the outlets from the passages in the driven member, and the outlets from the driving member being opposed to the inlets to the driven member. The opposed inlets and outlets are hereinafter referred to as the liquid transfer points. One of the members, for instance the driven member, may have a casing section 18 connected to the periphery of the outer dished wall and constituting a shell or casing around the other member. The parts so far described may be varied within wide limits as they are not new per se in the present invention and may be of any well known type or construction.

The coupling has been shown as of the constant liquid type, but may be of a type in which the liquid in the working chamber can be varied during operation, as for instance, as shown in co-pending application Ser. No. 550,108, which has matured into Patent Number 1,881,083.

In the specific construction shown in Figs. 1 and 2, there is provided, in accordance with the present invention, an auxiliary dished guide ring 22 in the driving portion of the coupling, and an auxiliary dished guide ring 23 in the driven portion thereof, these rings being interposed between the core rings and the outer walls of the working chamber, and extending throughout the distance between the liquid transfer points of the driving and driven members, so as to subdivide the working chamber into two circulating circuits, one enclosing the other.

The two circuits communicate with each other only at the transfer points and there preferably through narrow slits.

In order to decrease the frictional resistance imparted to the circulating liquid as the result of the increase of wall surface contacting with the circulating liquid, it is advantageous to reduce the number of guide vanes or blades from the usual number. In Fig. 2 there are shown only one-half the number of vanes or blades which might otherwise be employed.

In Figs. 3 and 4 there is shown a coupling in which the driving member is provided with two intermediate or auxiliary dished guide rings 24 and 25, and the driven portion is provided with two similar dished guide rings 26 and 27. These dished rings on the driving and driven members serve conjointly to subdivide the working chamber into three circuits.

It is advantageous to reduce the number of guide vanes still further with this increase in the number of guide rings employed in order to effect a reduction in frictional losses due to the increase in contacting surfaces. As shown in Fig. 4 there are only six such vanes or blades where two auxiliary guide rings are used, whereas eighteen are shown where one auxiliary ring is used in each member. Of course, these numbers are not essential and vary with the size and other characteristics of the coupling. The relative proportions illustrated are merely as examples.

In Figs. 5 and 6 there is shown a construction similar to that shown in Figs. 3 and 4, but in which the guide vanes have been eliminated, and their function for connecting the core and guide rings to the outer dished member effected by a corresponding number of narrow straps, struts or strips 30 which are thin and lie in radial longitudinal planes or are otherwise disposed to offer the least resistance to liquid flow.

In Figs. 7 to 10 inclusive there are shown constructions in which the intermediate guide rings extend only partially around the path of the impelling liquid. In Fig. 7 the driving and driven members of the coupling are provided with intermediate guide rings 31 and 32, which extend along only a part of the length of the working circuit from the inner liquid transfer point. They subdivide the portion of the working chamber nearest the shaft into two circulating circuits as here is the greatest tendency, under certain conditions, for the liquid to fail to follow the outer wall of the working chamber and short cut toward the core.

In Fig. 8 the construction is similar to that of Fig. 7, except that a pair of auxiliary guide rings 33 and 34, instead of being disposed in the portion of the working chamber nearest the center of the shafts, are mounted in that portion of the working circuit furthest from said shafts as here is the greatest tendency, under certain conditions, for the liquid to hug the outer wall under the action of centrifugal force.

Fig. 9 shows a construction in which there are combined the guide rings of Figs. 1 and 2 with the guide rings of Fig. 7. The working chamber is subdivided into two main circuits by guide rings 22 and 23 extending the full distance between the two liquid transfer sections of the driving and driven members. Interposed in each of these circuits are short guide rings 35 and 36 on the driving portion of the coupling, and short guide rings 37 and 38 on the driven portion, these rings being juxtaposed to subdivide the portion of the main circuits nearest the shafts. Through the agency of this arrangement, that portion of the working chamber where the circulating liquid is subjected to the greatest amount of radial reaction is constructed to effect the greatest regulation of this liquid.

Figure 10:
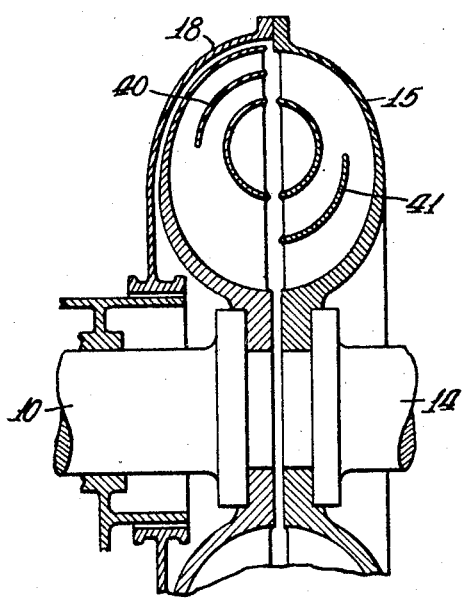

In Fig. 10 there is shown a combination of certain of the auxiliary short guide rings shown in Figs. 7 and 8. An intermediate short guide ring 40 is disposed in the driving member of the coupling at the outlet transfer end thereof, and a similar guide ring 41 is mounted in the driven member of the coupling and extending part way from the outlet transfer end of said driven member. By means of this arrangement, as the circulating liquid approaches the transfer point between the driving and driven members it is guided into a plurality of confining paths and prevented from changing its course under the action of centrifugal force.

Figure 11:
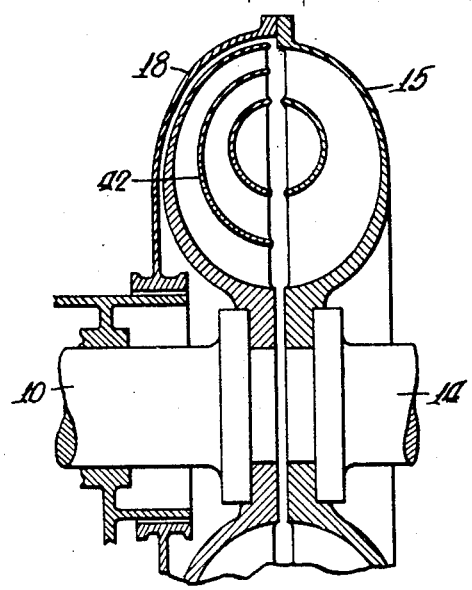

In Fig. 11 there is shown a construction in which the driving member alone is provided with an intermediate guide ring 42 which extends along the entire length of the path in the driving member of the operating circuit. Either member of this construction may serve for driving and the other may be driven, so that the driven member alone has the intermediate guide ring. Any number of these guide rings may be provided on the driving or driven member in accordance with the present invention.

Figure 12:
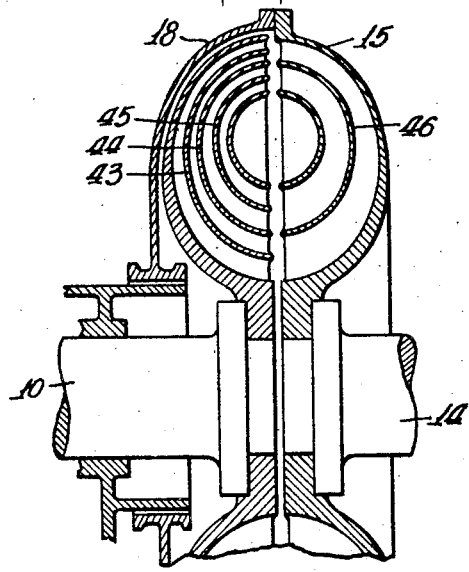

Fig. 12 shows a coupling combining the features of Figs. 1 and 11. More guide rings are mounted in one operating member than there are in the other. For instance, the driving member is shown as having three auxiliary guide rings 43, 44 and 45 dividing the driving portion of the working chamber into four operating circuits, and the driven member is provided with a single auxiliary guide ring 46 dividing the driven portion of the working chamber into two operating circuits.

Many forms of the present invention have been shown for the purposes of illustration, but these forms are not intended to define the limits of the invention. It is obvious, for instance, that these guide rings may be arranged in any order or combination to effect any selective regulation, in accordance with the operating conditions desired, without departing from the spirit of the invention.

Having thus described our invention, what we claim as new an desire to secure by Letters Patent is:

1. A hydraulic coupling of the Föttinger type, including a driving member and a driven member, each having an annular outer wall and an annular inner wall, said inner walls forming a core and said outer walls forming a working chamber around said core for the circulation of liquid in a vortex ring, and an annular guide wall carried by one of said members between the outer and inner walls thereof, and forming with said walls separate paths for the liquid flow in the same direction, but at different distances from said core, said paths being in open communication with each other in the plane between said members.

2. A hydraulic coupling of the Föttinger type, including a driving member and a driven member, each having an annular outer wall and an annular inner wall, said inner walls forming a core and said outer walls forming a working chamber around said core for the circulation of liquid in a vortex ring, and annular guide walls carried by each of said members between the outer and inner walls thereof and forming with said walls separate paths for the liquid flow in the same direction, but at different distances from said core, said paths being in open communication with each other in the plane between said members.

3. A hydraulic coupling including a driving member, a driven member, said members defining a liquid working chamber therebetween, and including a pair of rings juxtaposed to form a core for said working chamber, and an auxiliary guide ring connected to one of said members and interposed between said core and the outer wall of said working chamber, said guide ring extending in the direction of flow of the circulating liquid around said core and subdividing the chamber into separate paths in open communication with each other in a portion of said chamber.

4. A hydraulic coupling including a driving member, a driven member, said members having liquid working chamber portions with liquid transfer points, each member having a pair of rings juxtaposed to form a core for said working chamber, and an auxiliary guide ring within one of said members and interposed between said core and the outer wall of the working chamber to form separate paths for the liquid at different distances from said core, said auxiliary guide ring extending from one of the liquid transfer points of said member in the direction of flow of the circulating liquid around said core, and terminating at a point spaced from the other liquid transfer point whereby said paths merge in a portion of the chamber.

5. A hydraulic coupling including a driving member, a driven member, said members having liquid working chamber portions with liquid transfer points, each member having a pair of rings juxtaposed to form a core for said working chamber, and an auxiliary guide ring in each of said members and extending from the outlet liquid transfer point of said member only part way toward the inlet transfer point of the same member.

6. A hydraulic coupling including a driving member, a driven member, said members defining a liquid working chamber therebetween having outer and inner liquid transfer points, and an auxiliary guide ring in the path of flow of liquid in each of said members, said guide rings extending only part way from the outer liquid transfer point toward the inner transfer point subdividing the portion of the working chamber furthest from the center of rotation of the coupling into a plurality of liquid operating circuits.

7. A hydraulic coupling including a driving member, a driven member, said members defining a liquid working chamber therebetween having outer and inner liquid transfer points, and an auxiliary guide ring in the path of flow of liquid in each of said members, said guide rings extending only part way from the inner liquid transfer point subdividing the portion of the working chamber nearest the center of rotation of the coupling into a plurality of liquid operating circuits.

8. A hydraulic coupling including a driving member, a driven member, said members defining a liquid working chamber therebetween for the circulation of a single body of liquid, and including a pair of rings juxtaposed to form a core for said working chamber, and a guide ring connected to one of said members and interposed between said core and the outer wall of said working chamber, said guide ring extending from the liquid outlet point of its associated member partially into the operating circuit of said member in the direction of flow of the circulating liquid to form separate paths for the liquid at different distances from the core, said paths merging at the edge of said guide ring.

9. A hydraulic coupling including a driving member, a driven member, said members defining a liquid working chamber therebetween, and including a pair of rings jutaposed to form a core for said working chamber, and a guide ring connected with each of said members and interposed between said core and the outer wall of said working chamber, said guide rings extending from the liquid outlet transfer point of their associated members partially into the operating circuit of said members in the direction of flow of the circulating liquid.

10. A hydraulic coupling including a driving member and a driven member, each having an outer wall and a core ring section, said members defining a liquid working chamber therebetween, one or more guide rings connected with each to said members and interposed between the core and the outer wall of said working chamber, said guide rings extending between the liquid transfer points of the members and juxtaposed to subdivide the circulation of liquid in said working chamber into a plurality of adjoining operating circuits, and another guide ring partially extending in said subdivided operating circuits in the direction of flow.

11. A hydraulic coupling including a driving member and a driven member, each having an outer wall and a core ring section, said members defining a liquid working chamber therebetween, one or more guide rings connected with each of said members and interposed between the core and the outer wall of said working chamber, said guide rings extending between the liquid transfer points of the members and juxtaposed to subdivide the circulation of liquid in said working chamber into a plurality of adjoining operating circuits, and another guide ring disposed in one of said subdivided operating circuits and partially extending in said circuit from one of the liquid transfer points of said members.

12. A hydraulic coupling including a driving member and a driven member, each having an outer wall and a core ring section, said members defining a liquid working chamber therebetween, one or more guide rings connected with each of said members and interposed between the core and the outer wall of said working chamber, said guide rings extending between the liquid transfer points of the members and juxtaposed to subdivide the circulation of liquid in said working chamber into a plurality of adjoining operating circuits at different distances from said core ring sections, and another guide ring in one of said circuits and partially extending from one of the liquid transfer points of said members.

13. A hydraulic coupling of the Föttinger type, including a driving member and a driven member, each having an annular outer wall and an annular inner wall, said inner walls forming a core and said outer walls forming a working chamber around said core for the circulation of liquid in a vortex ring, an annular guide wall carried by one of said members between the outer and inner walls thereof, and forming with said walls separate paths for the liquid flow at different distances from said core, and spacing members for supporting said auxiliary annular wall and extending along only small portions of the liquid paths.

Signed at Hamburg, Germany, this 24th day of June, 1931.

JOHANN NIKOLAUS KIEP.
WALTER BROSE.